S. Marden,
Car-Brake.

N° 74,235. Patented Feb. 11, 1868.

Witnesses
John R. Baker
Chs. N. Hinchock

Inventor
Samuel Marden

United States Patent Office.

SAMUEL MARDEN, OF NEWTON, MASSACHUSETTS.

Letters Patent No. 74,235, dated February 11, 1868.

IMPROVED CAR-BRAKE.

*The Schedule referred to in these Letters Patent and making part of the same.*

TO ALL WHOM IT MAY CONCERN:

Be it known that I, SAMUEL MARDEN, of Newton, in the county of Middlesex, and State of Massachusetts, have invented a new and improved Brake, of which the following is a full description, reference being had to the accompanying drawings, making a part of the specification, in which—

Figure 1:
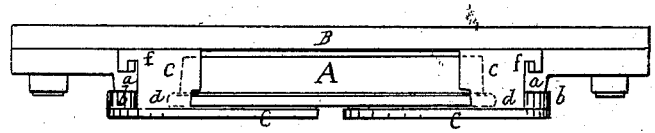
Figure 2:
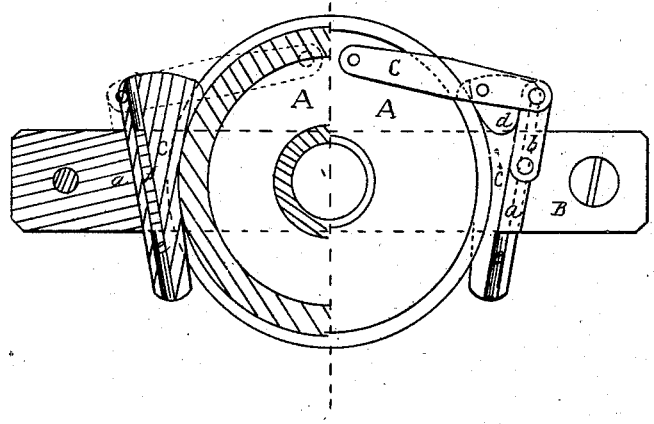
Figure 3:
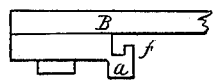

Figure 1 is a plan.
Figure 2, a part section and part elevation.
Figure 3, a plan of the abutment; and
Figure 4 a side elevation of one wedge.

Figure 4:
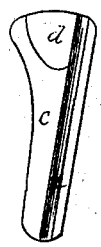

A is a car-wheel, and B, fig. 1, its supporting-rail or frame, upon which is firmly secured the abutment $a$, fig. 3, with its spline, $f$. Fig. 4 shows the wedge $c$, with its concave surface adapted to the tread, and the part $d$ to the flange of the wheel. The groove $e$ is made to correspond with and work upon the spline $f$ of the abutment $a$. $b$ is the movable fulcrum of the lever C, which works the wedge $c$.

To brake the wheel, a downward pressure is applied to the lever C, which, working on its movable fulcrum, $b$, carries the wedge $c$, working through its groove, $e$, upon the spline $f$, firmly between the stationary abutment and the wheel. Raising the levers immediately takes off the brakes.

The advantages of my invention are, the small amount of power required in applying the brakes; the great resistance they offer to the wheel, one wedge pushing down against the upward motion of the wheel with a greater amount of friction than the ordinary pressing-brake, while the other, by the downward motion of the wheel, is firmly wedged in between the wheel and abutment, and which, if it should offer too great friction, such as to slide the wheel, can be easily regulated by continuing upward the concave surface of the wedge; the facility with which any part can be replaced, and its perfect simplicity.

What I claim, is—

1. The stationary abutment $a$, with its spline, $f$, in combination with the wedge-brake $c$, with its groove $e$, substantially as described.

2. The levers C C, in combination with the brake-wedge $c$, substantially as described.

3. The wedge-brake $c$, with its projection or cam-brake $d$, for the purpose of operating on the periphery of the flange, as well as on the tread of the wheel.

4. The wedge-brake $c$, constructed, arranged, and operated substantially as described.

SAM'L MARDEN.

Witnesses:
JOHN R. BAKER,
G. N. HITCHCOCK.